(12) United States Patent
Mandal

(10) Patent No.: US 6,959,264 B2
(45) Date of Patent: Oct. 25, 2005

(54) AUTONOMOUS COMPUTING PROBE AGENT

(75) Inventor: Partha Mandal, Gujarat (IN)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 10/675,473

(22) Filed: Sep. 30, 2003

(65) Prior Publication Data

US 2005/0071127 A1 Mar. 31, 2005

(51) Int. Cl.[7] ............................................... G06F 11/30
(52) U.S. Cl. ...................... 702/186; 702/182; 702/187; 702/188; 709/226
(58) Field of Search ................................. 702/182, 186, 702/187, 188; 709/219, 226; 711/153, 203; 719/312, 313

(56) References Cited

U.S. PATENT DOCUMENTS 5,572,672 A * 11/1996 Dewitt et al. ................. 714/47
6,049,798 A * 4/2000 Bishop et al. ................. 707/10
2002/0112008 A1 * 8/2002 Christenson et al. ........ 709/206

* cited by examiner

Primary Examiner—Bryan Bui

(74) Attorney, Agent, or Firm—Anthony V S England; T. Rao Coca (57) ABSTRACT

Probing and monitoring of applications in a distributed computer network is achieved using a probe designed to be integrated into the kernel of an operating system. The probe intelligently delegates the periodic probing functionality into the kernel of the operating system. As the operating system already monitors system resources for its own resource allocation purposes, such functionality represents minimal extra computational and network load. The resource probing application on a client machine runs a simple algorithm on the matrix data, depending on the server request.

8 Claims, 13 Drawing Sheets

```
#include <linux/module.h>
#include <linux/fs.h>
#include <linux/mm.h>
#include <linux/malloc.h>
include <linux/sched.h> define PROBE_MAJOR 0 struct file_operations cpu_probe_fops = {
        read:  probe_read,
        write: probe_write,
        open:  probe_open,
        release: probe_release,
        mmap: probe_mmap,
};

void *buffer;      // place to store the physical address of the kernel pages
void *head_buffer; //current location to be written by our timer function
struct semaphore sem;

//use dynamic assignment
int probe_major =PROBE_MAJOR;
int order=0; //request for one page only int init_module(void)
{
        result=register_chrdev(probe_major,"cpu_probe",&cpu_probe_fops);
        if(result<0) {
                printk(KERN_WARNING"cpu_probe: can't get major %d \n",probe_major);
                return results;
        }
        if (probe_major==0) probe_major=result;

buffer = (void*)__get_free_pages(GFP_KERNEL,order)
```

FIG. 9A

```
        if(!Buffer)
                goto nomem;

memset(buffer,0,PAGE_SIZE<<order);
        return 0;

nomem:
        unregister_chrdev(probe_major,"cpu_probe");
        return 1;
} void cleanup_module(void)
{
        if(buffer)
                free_pages((unsigned long)(buffer),order);

unregister_chrdev(probe_major,"cpu_probe");

} int probe_open(struct inode * inode, struct file *filp)
{
        MOD_INC_USE_COUNT;
        return 0;
} int probe_release(struct inode *inode, struct file *filp)
{
        MOD_DEC_USE_COUNT;
        return 0;
} int probe_read(struct file *filp, char * buf, size_t count, loff_t *fpos)
```

FIG. 9B

```
{
        if(copy_to_user(buf,(char*)buffer,PAGE_SIZE)))
        return -EFAULT;
        return PAGE_SIZE;
} int probe_mmap(struct file *filp,struct vm_area_struct *vma)
{
        unsigned long offset=buffer;

if(offset>=_ _pa(high_memory)||(filp->f_flags&O_SYNC))
                vma->vm_flags |=VM_IO;
        vma->vm_flags |= VM_RESERVED;
        If(remap_page_range(vma->vm_start,offset,vma->vm_end - vma->vm_start,
        return -EAGAIN;
return 0;
}

// pages[order] array of number of pages
/* the memory address returned by kmalloc and get_free_pages are also
virtual addresses.their actual value is still massaged by the MMU before
it is used to address physical memory */ wait_queue_head_t probe_wait;
struct timer_list probe_timer;

void probe_read_pid(unsigned long ptr)
{
        written =sprintf((char*)head_buffer,"%08u",(int)(current->pid));
        probe_data.len=+sizeof(int);
        probe_data.buf=buffer+sizeof(int);
        wake_up_interruptible(&probe_wait);
}
```

FIG. 9C

```
void probe_write(struct file *filp, char *buf, size_t count, loff_t *fpos)
{
        probe_data.len=0;
        probe_data.buf=buffer;
        probe_data.jiffies=jiffies;
        probe_data.queue=NULL;

init_timer(&probe_timer);
        probe_timer.function = probe_read_pid;
        probe_timer.data=(unsigned long) &probe_data;
        probe_timer.expires=jiffies+HZ;     //one sec timeout
        add_timer(&probe_timer);
        interruptible_sleep_on(&probe_wait);
        del_timer_sync(&probe_timer);

return 0;
}
```

AUTONOMOUS COMPUTING PROBE AGENT

FIELD OF THE INVENTION

The present invention relates generally to resource monitoring on a computer network. More specifically, the invention relates to monitoring and managing resources present in a distributed computing environment.

BACKGROUND

An autonomous computing model revolves around the interactions between networked computers that can intelligently distribute their workload between computers. Data storage and processing capabilities are distributed over a network in a distributed computing environment. The machines in a distributed system may have different hardware architectures and operating systems.

Distributed systems are based on intelligent components that are capable of self-governing actions in dynamic and heterogeneous environments. These distributed systems make the environment autonomous and intelligent, and can reduce user interaction. Many distributed computing architectures involve "lightweight" software agents installed on a number of client systems, and one or more dedicated distributed computing management servers. The servers take distributed computing requests, and divide their large processing tasks into smaller tasks that can run on individual desktop computer systems.

As an example, an agent running on a client computer system may detect when the system is idle, notify a management server that the system is available for processing, and request an application package. The client system then receives the requested application package from the server, and runs the application package when spare processor cycles are available. The client system sends the results back to the server.

Figure 10:
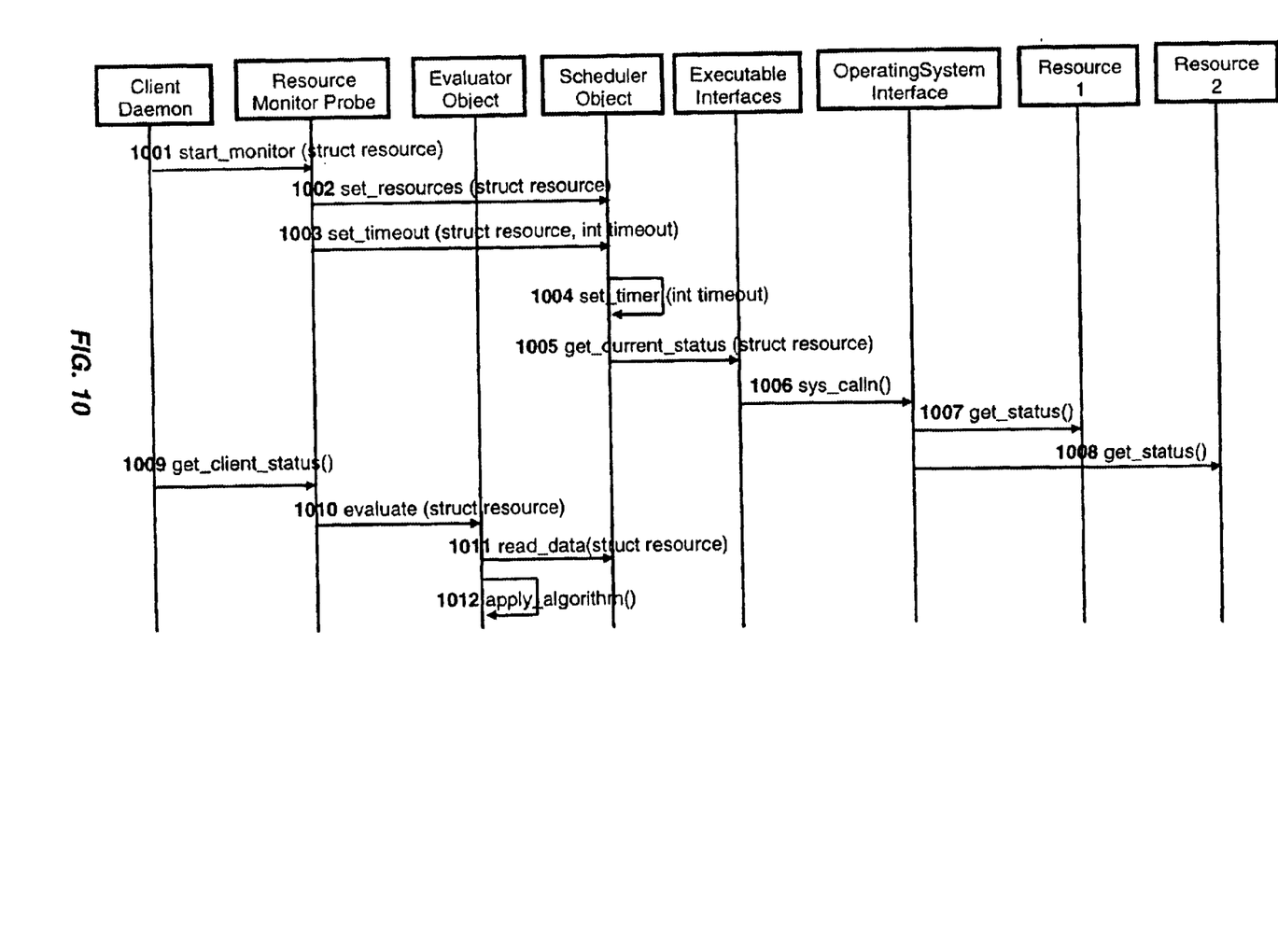
FIG. 10 is a sequence diagram of an existing monitoring agent in a distributed computing environment.

This example is further illustrated by a sequence diagram, represented in FIG. 10, which relates to a generic monitoring agent in a distributed computing environment. A client daemon that runs continuously on the client system for processing requests receives a request to monitor a resource. A monitoring agent on the client system initializes its various components, such as scheduler and evaluator objects.

The monitoring agent notifies its scheduler object of a timeout value. The monitoring application also notifies the evaluator object of the task and algorithm to be applied to the data collected by the scheduler object. The scheduler object collects data from the system by invoking appropriate interfaces or system calls provided by the operating system. When the server requests a status of a resource, the monitoring agent sends an evaluate request to the evaluator object, and then the evaluator object asks the scheduler object for metrics to apply the algorithm. The processed data is then returned to the server.

Table 1 below describes, in outline, steps of FIG. 10.

TABLE 1

| | |
|---|---|
| Step 1001 | A client daemon sends the monitoring agent with a request relating to a resource to be monitored. |
| Step 1002 | The monitoring agent sends the resource details to the scheduler object. |
| Step 1003 | A timeout for the scheduler object is set for this particular resource. |
| Step 1004 | The scheduler object registers itself to a timer. |
| Step 1005 | With every timeout, the scheduler object gets the status of the resource by invoking a suitable executable. |
| Step 1006 | The executable makes a system call to operating system. |
| Steps 1007 and 1008 | Operating system fetches the status of the particular resource. This information is stored by the scheduler object for each timeout. |
| Step 1009 | When a request comes from the server, the client daemon again communicates with the monitoring agent. |
| Step 1010 | The evaluator object is invoked with the required algorithm to be performed on the resource data. |
| Step 1011 | The evaluator object collects the matrix information from the scheduler object. |
| Step 1012 | The evaluator object executes the algorithm on the data and sends the results to monitoring agent to be finally send to server. |

A need for an improved manner of monitoring distributed resources clearly exists in view of the observations made above.

SUMMARY

A technique, and an associated software design, for probing and monitoring applications in a distributed computing environment is described. The probe design is integrated into the kernel of an operating system on a client system. More specifically, the design described herein intelligently delegates the periodic probing functionality to the kernel of the operating system. Performing such delegation is "lightweight" in terms of operating system burden, since the operating system already monitors system resources for its own resource allocation purposes.

The impact of the monitoring agent on the observed parameters is negligible. The offset added by the monitoring agent to the ideal data expected on a particular resource is marginally small. The resource probing application on a client machine is now only left with running a simple algorithm on the matrix data, depending on the server request. In most operating systems, such matrix data or memory segments can be directly made available to a monitoring agent without needing to create a duplicate copy.

Interrupt-based programming is used to develop kernel task routines. The programming model makes the monitoring agent completely transparent to user of the client system. This programming model reduces the burden on the client system's application space and has a relatively small impact on the resources of the client system.

DETAILED DESCRIPTION

An autonomic computing probe agent is described with reference to five example sequences of events that illustrate the operation of the agent through its interaction with the computing system in which the probe agent is resident. Before describing the five examples presented herein, a description of the various components is provided directly below. Computing hardware of the type able to be used in implementing the probe agent is then described, which is followed by a description of relevant software implementational observations. An example of relevant source code follows the five presented examples.

Components

Figure 1:
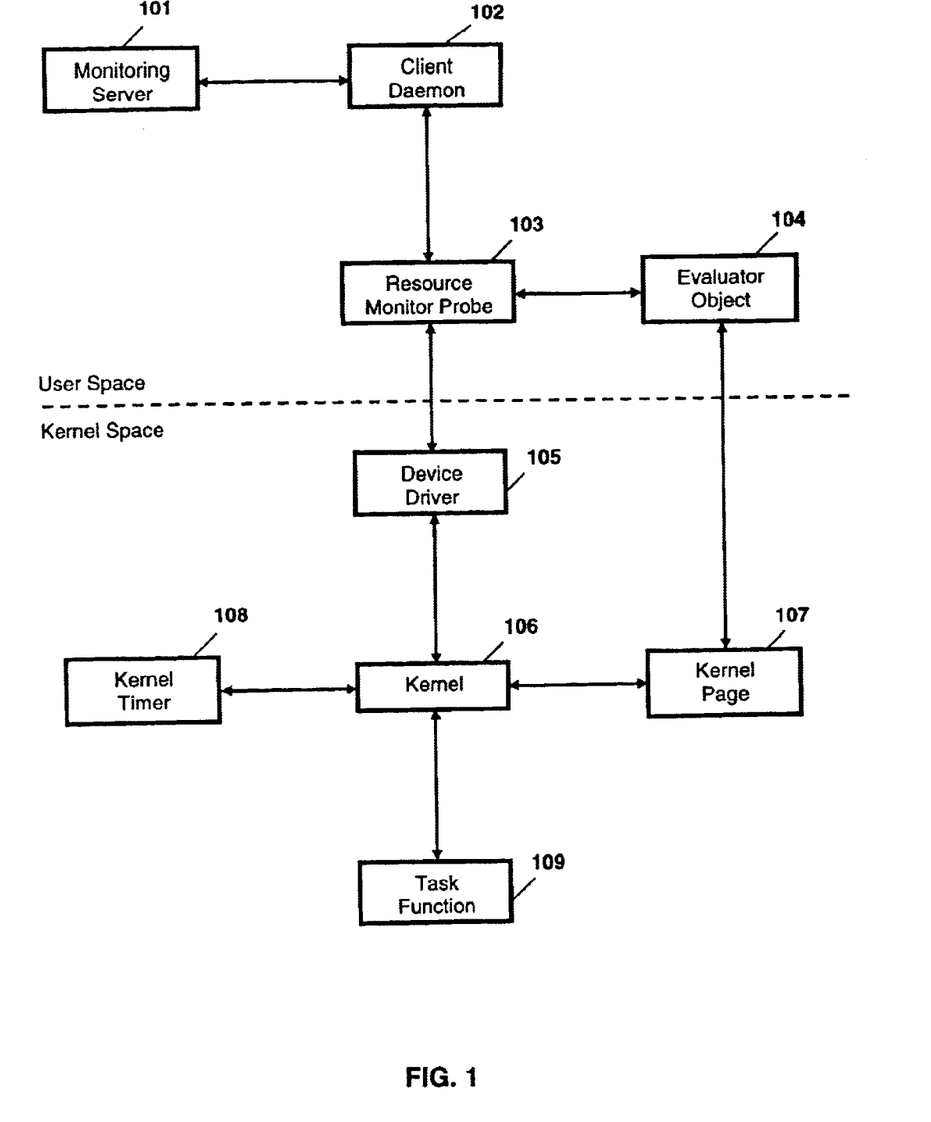
FIG. 1 is a schematic representation of the components involved in providing a probe agent as described herein.

FIG. 1 schematically represents the components involved in describing the Resource Monitor Probe 103. Events involving the Resource Monitor Probe 103 are initiated by the Client Daemon 102, which runs of a Client System under an Operating System. Requests are sent to the Client Daemon 102 from a Monitoring Server 101, and are described by way of example to illustrate how the states of the various described components changes in the Client System.

Monitoring Server

Monitoring Server 101 is a server application, interested in monitoring a resource on a Client System. The Monitoring Server 101 may reside on a particular server, or be distributed on various servers, for example.

Client Daemon

Client Daemon 102 is a daemon process that is sent to the Client System by the Monitoring Server 101, to monitor various resources on the Client System. This may involve, for example, software, hardware, or networking of the Client System. Thus, Client Daemon 102 acts as a communication channel between the Monitoring Server 101 and the Client System being monitored. This Client Daemon 102 holds the references of different Resource Monitor Probes 103, sent by Monitoring Server 101.

Resource Monitor Probe

Resource Monitor Probe 103 is an agent, which monitors a resource on the Client System. Resource Monitor Probe 103 executes an Evaluator Object 104 and returns the consolidated data to the Monitoring Server 101. Resource Monitor Probe 103 executes in User Space when requested to execute by the Monitoring Server 101.

Evaluator Object

Evaluator Object 104 carries an analysis algorithm to be executed on the data gathered by the Task Function 109. Evaluator Object 104 executes in User Space.

Device Driver

Device Driver 105, at the time of initialization, acts as the creator of a data page and task operations. Device Driver 105 integrates the task operations into timer tasks. Until Device Driver 105 is unloaded, Device Driver 105 acts as a communication channel between the Probe and Kernel 106.

Kernel

Kernel 106 is the core of the Operating System on the Client System, and thus has various relevant features. The Resource Monitor Probe 103 integrates itself into the Kernel 106 of the Operating System to perform its functions. The most important component integrated into Kernel 106 is the Task Function 109.

Kernel Page

Kernel Page 107 has two parts. One part is a device driver interface routines code. A second part of the Kernel Page 107 is a circular bitmap buffer, which is used for logging monitored parameters. The Resource Monitor Probe 103 does not need more than a page of memory, hence use of the Kernel Page 107.

Kernel Timer

Kernel Timer 108 is a part of the Kernel 106 (that is, the base operating system) to which the Resource Monitor Probe 103 is linked through Task Function 109.

Task Function

Task Function 109 is dynamically created by the Device Driver 105 and linked to the Kernel Timer 108. The job of Task Function 109 is to scan the software, hardware, or network resources periodically.

Procedural Overview

Figure 2:
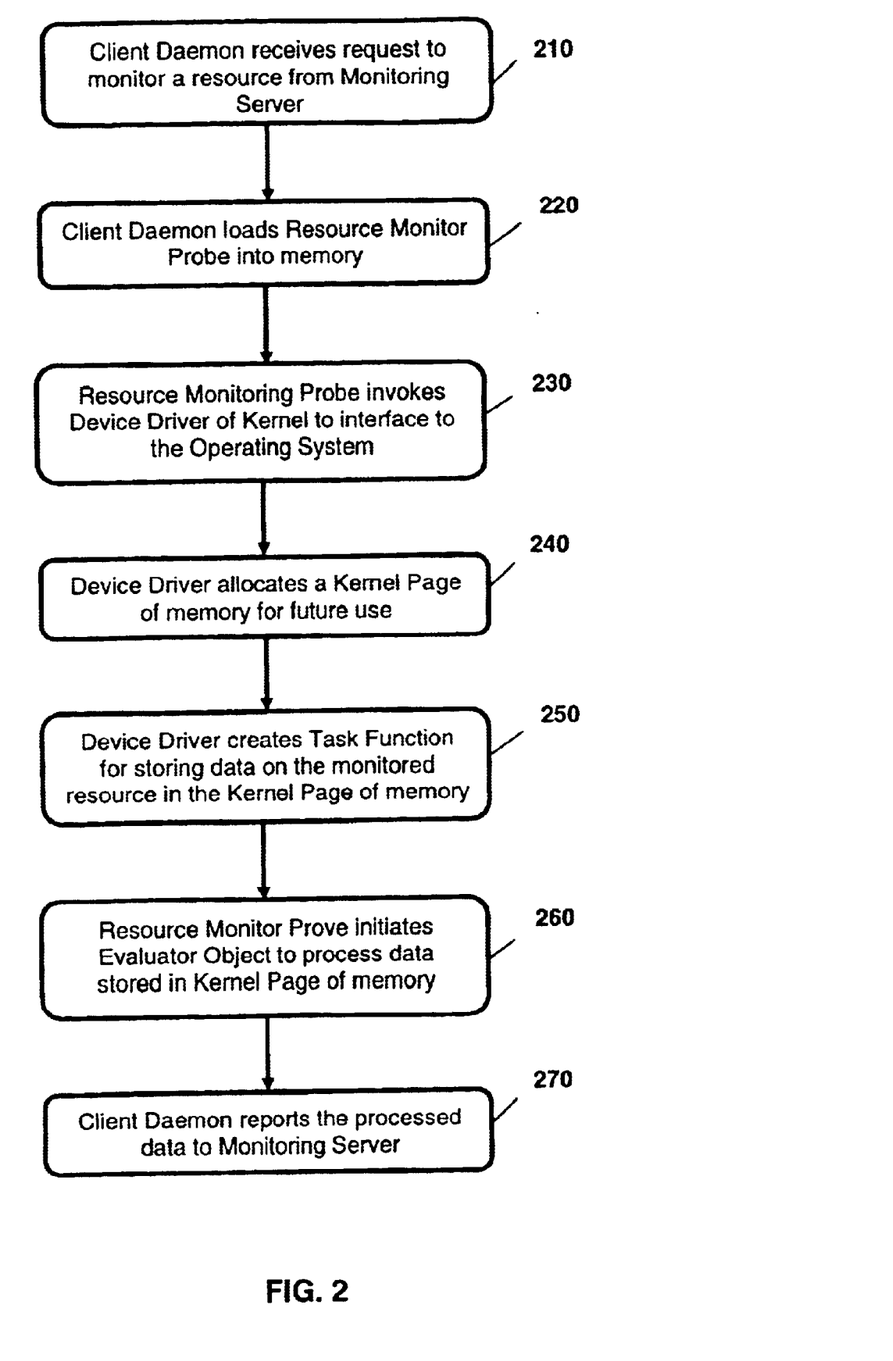
FIG. 2 is a flow chart representing steps involved in the probe agent as described herein.

FIG. 2 is a flow chart that describes, in overview, steps involved in operation of the Resource Monitor Probe 103 described herein.

First, a Client Daemon 102 receives a request from the Monitoring Server 101 to monitor a resource in step 210. Client Daemon 102 loads the Resource Monitor Probe 103 into memory in step 220. Resource Monitoring Probe 103, in turn, loads and initializes a Device Driver 105 in step 230. This Device Driver 105 performs the role of an interface between the Kernel 106 of the Operating System and the Resource Monitor Probe 103.

Device Driver 105 at this stage only allocates a Kernel Page 107 for future use in step 240. After completing initialization of Device Driver 105 in step 230, Device Driver 105 establishes a Task Function 109 for collecting data concerning the monitored resource, and storing this data in the Kernel Page 107 in step 250. Resource Monitor Probe 103 initializes an Evaluator Object 104 in step 260. The purpose of this Evaluator Object 104 is to run an algorithm to process data collected by the Task Function 109 in step 250. Finally, the Client Daemon 102 reports the processed data back to the Monitoring Server 101 in step 270.

Computer Hardware

Figure 3:
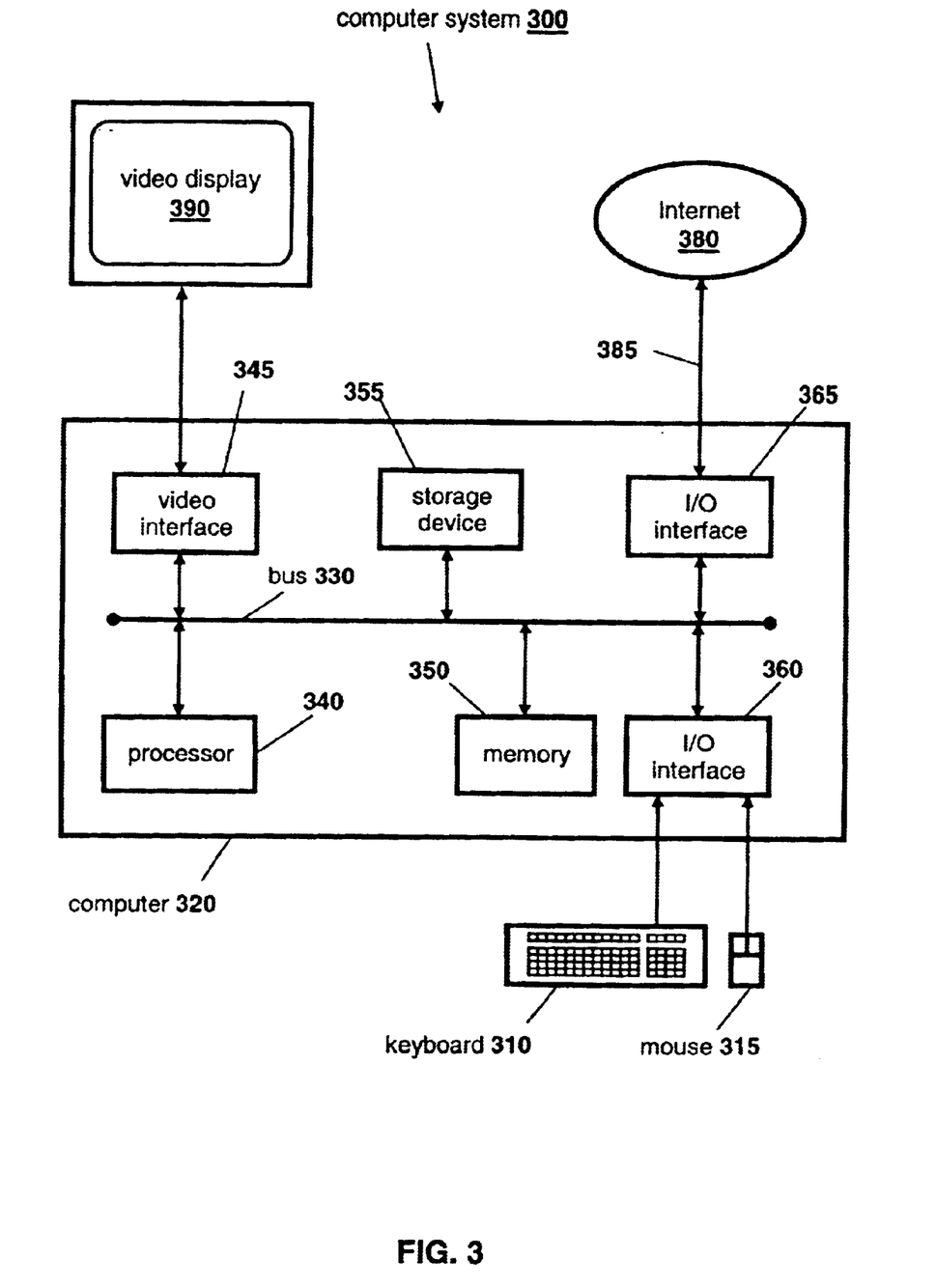
FIG. 3 is a schematic representation of a computer system suitable of a type suitable for providing the probe agent described herein.

FIG. 3 is a schematic representation of a computer system 300 typical of the type of Client System on which the Resource Monitor Probe 103 can be implemented.

Computer software that implements the Resource Monitor Probe 103 and related functionality executes under a suitable operating system installed on the computer system 300.

The components of the computer system 300 include a computer 320, a keyboard 310 and mouse 315, and a video display 390. The computer 320 includes a processor 340, a memory 350, input/output (I/O) interfaces 360, 365, a video interface 345, and a storage device 355.

The processor 340 is a central processing unit (CPU) that executes the operating system and the computer software executing under the operating system. The memory 350 includes random access memory (RAM) and read-only memory (ROM), and is used under direction of the processor 340.

The video interface 345 is connected to video display 390 and provides video signals for display on the video display 390. User input to operate the computer 320 is provided from the keyboard 310 and mouse 315. The storage device 355 can include a disk drive or any other suitable storage medium.

Each of the components of the computer 320 is connected to an internal bus 330 that includes data, address, and control buses, to allow components of the computer 320 to communicate with each other via the bus 330.

The computer system 300 can be connected to one or more other similar computers via a input/output (I/O) interface 365 using a communication channel 385 to a network, represented as the Internet 380.

The computer software may be recorded on a portable storage medium, in which case, the computer software program is accessed by the computer system 300 from the storage device 355. Alternatively, the computer software can be accessed directly from the Internet 380 by the computer 320. In either case, a user can interact with the computer system 300 using the keyboard 310 and mouse 315 to operate the programmed computer software executing on the computer 320.

The computer system 300 described above is described only as an example of a particular type of system suitable for use as a Client System.

Computer Software

Figure 9A:
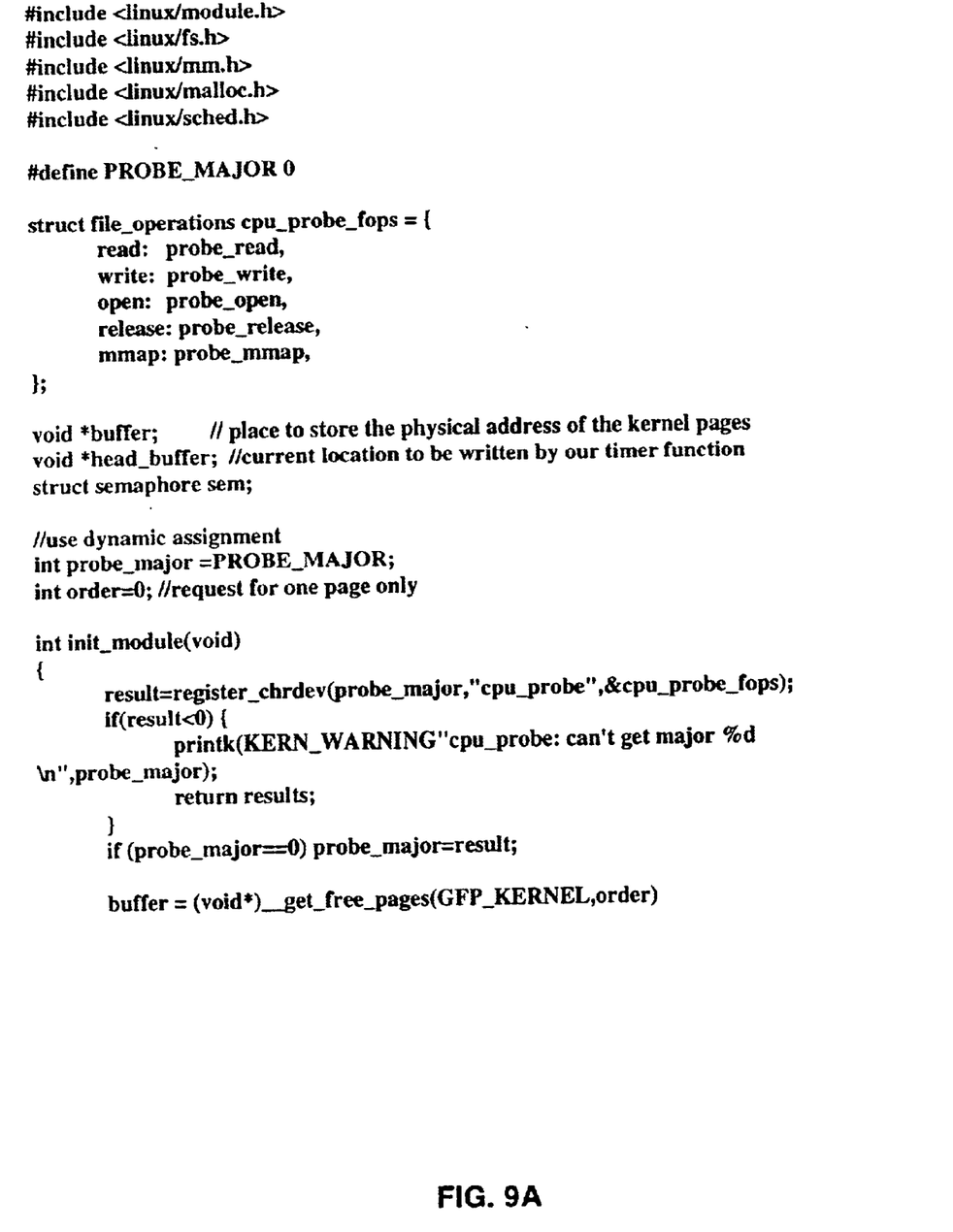
FIGS. 9A, 9B and 9C jointly present computer code for a device driver implemented on the Linux operating system environment.
Figure 9B:
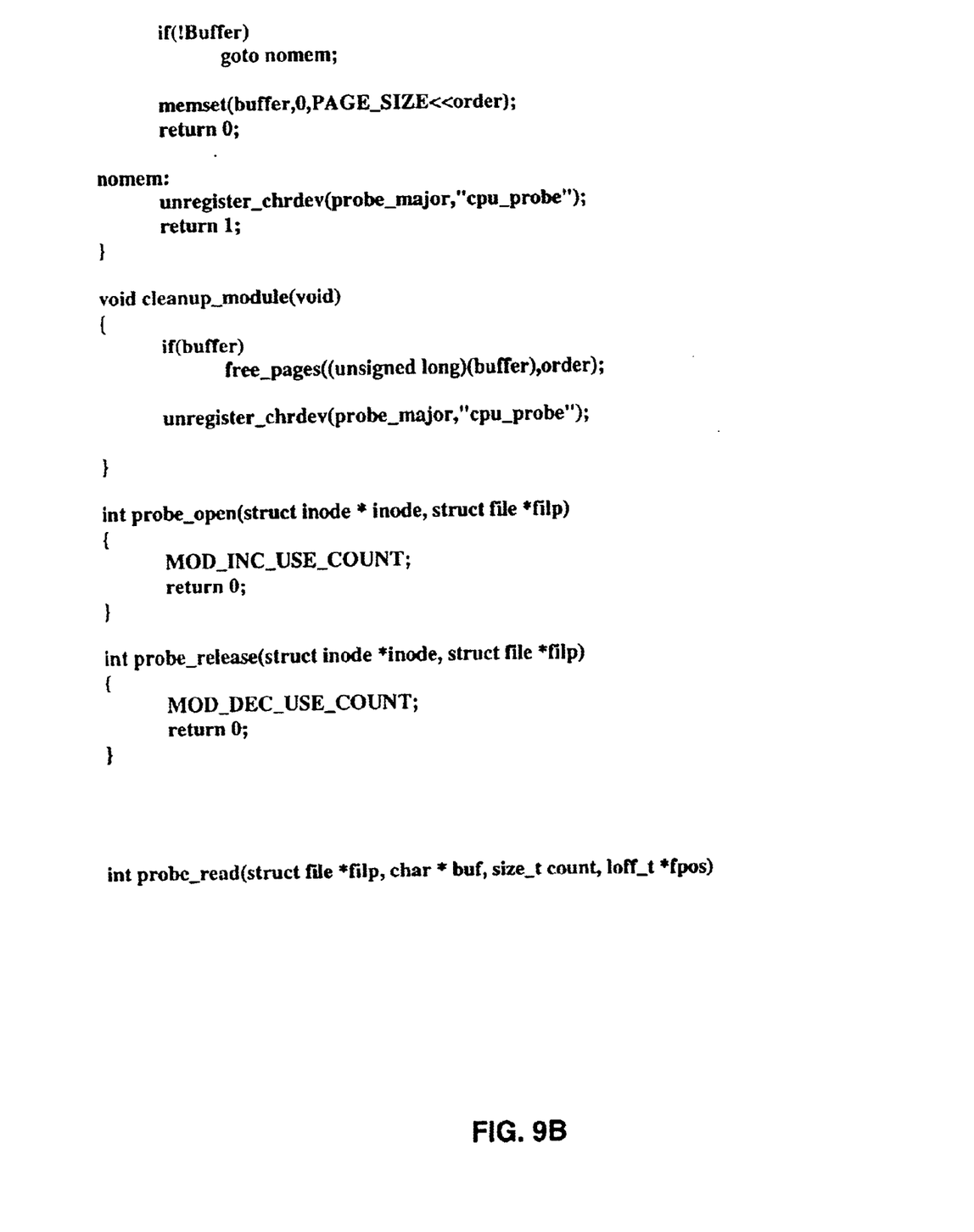
Figure 9C:
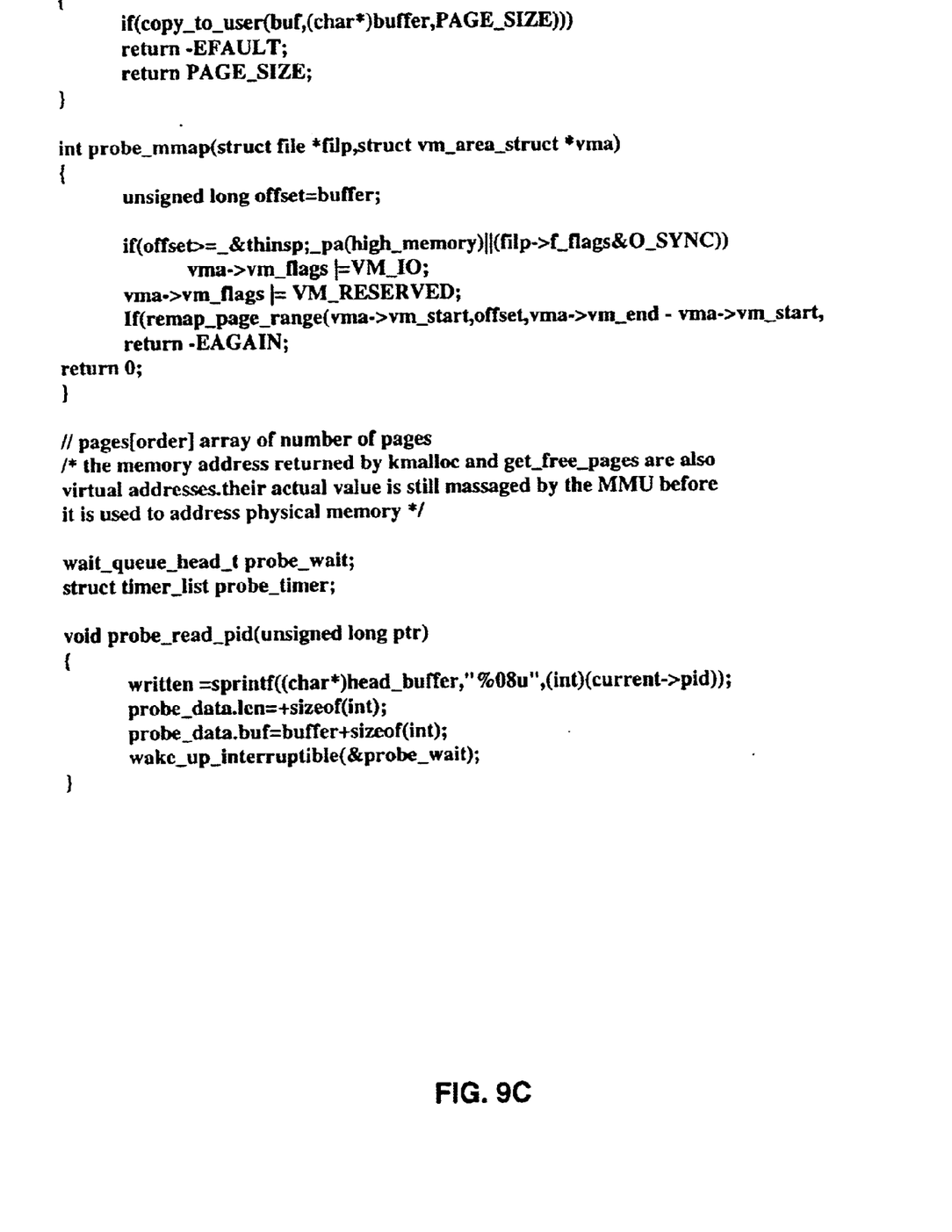
Figure 9D:
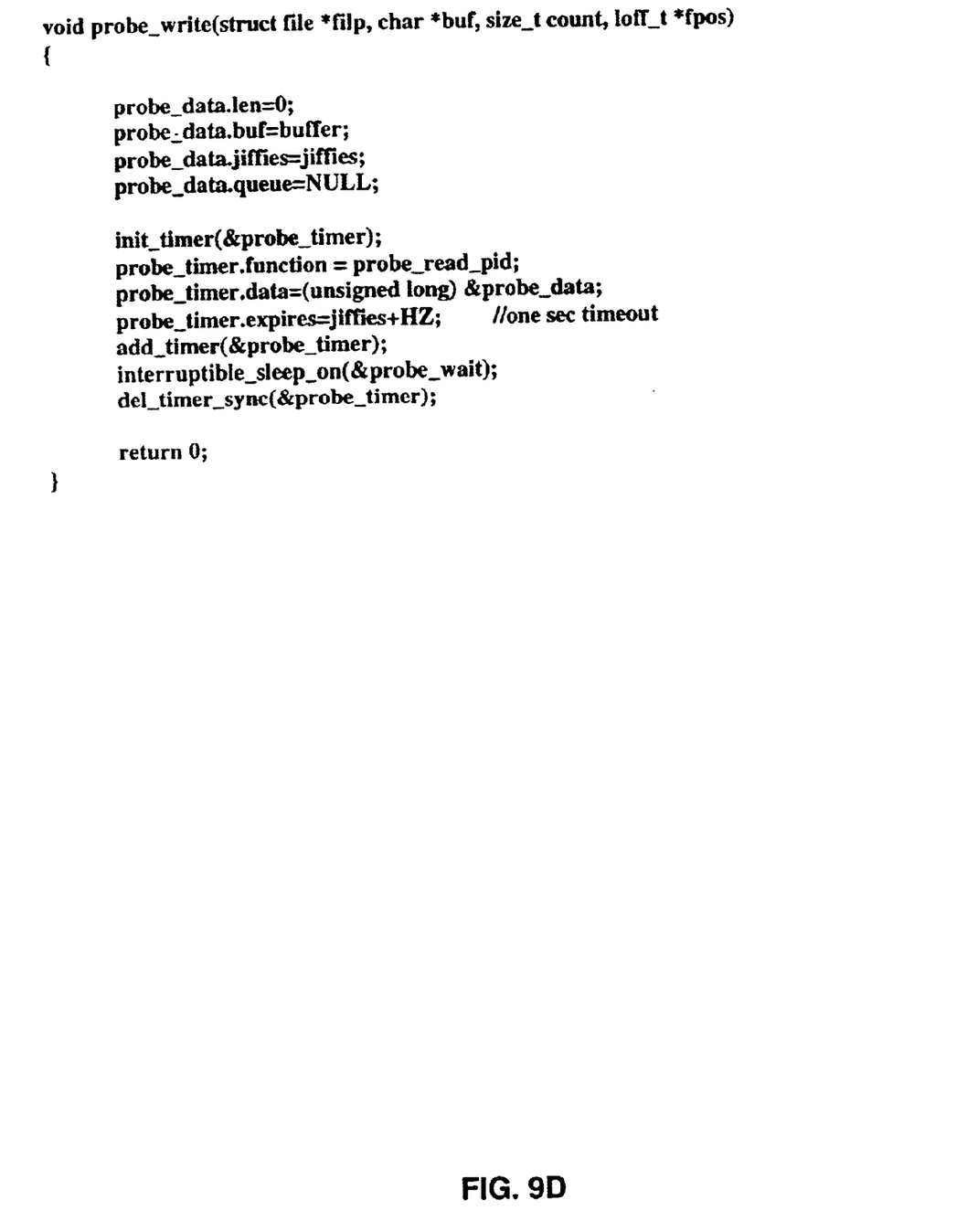

FIGS. 9A, 9B and 9C presents code for the Device Driver 105 for monitoring a process, implemented on an installation of the Linux Operating System. As noted above, the computer system 300 is an example of suitable computing hardware for a Client System on which on which the Device Driver 105 can be provided.

The Device Driver 105 is implemented in software such that utilization of the processor 340 is measured in distributed computing applications for a particular distributed process for a particular client in a networked environment. The Device Driver 105 is invoked in each Client System in a distributed environment The purpose of the Device Driver 105 is to create a binary entry reflecting the state of the processor 340 at an interval of 10 ms with respect to the process being observed. The entry is 1 if the process is executing at that instance of time when measurement was taken, and 0 if the process is not running.

The Kernel 107 does not have a thread running on its own. Instead, the Kernel 107 has a set of services referred to as "top half" services, and a set of interrupt routines referred to as "bottom half" services.

At any instant, the processor 340 may be in one of following stages.

(a) A process is running in User Space or Kernel Space. When there is a process request for a service, and the Kernel 106 executes under the context of that process.

(b) The processor 340 is executing under interrupt mode.

(c) The processor 340 is put in a halt state, since there is no process ready to run.

The kernel code can know the current process driving the code by accessing the global item "current" a pointer to "struct tasks_struct". In the Linux operating system, this variable is declared in he header code <asm/current.h>, which is included by header code <linux/sched.h>. The "current" pointer refers to the user process (PID) currently executing. That is, current→pid.

To probe processes running on the processor 340 at regular intervals, the Device Driver 105 registers a tasks queue to Kernel Timer 108. The Kernel Timer 108 is precise to the level of the clock frequency of the processor 340. Task Function 109 is invoked in a timeout specified during registration (which is always a value multiple of the clock pulse time of the processor 340).

These invocations to the Kernel Timer 108 are in the context of any random process, which is running at that instant. The responsibility of the Task Function 109 pointed by the Kernel Timer 108 is only to write "current→pid" to the Kernel Page 107 in a circular fashion.

This Kernel Page 107 (which is primarily owned by the Device Driver 105) is memory mapped by the monitor application, hence the data collected is also available under the process context of monitor application through virtual table mapping. The monitor application can access and process that data at its leisure or whenever a request comes from the Monitoring Server 101.

EXAMPLE 1

Process Monitor Probe

Figure 4:
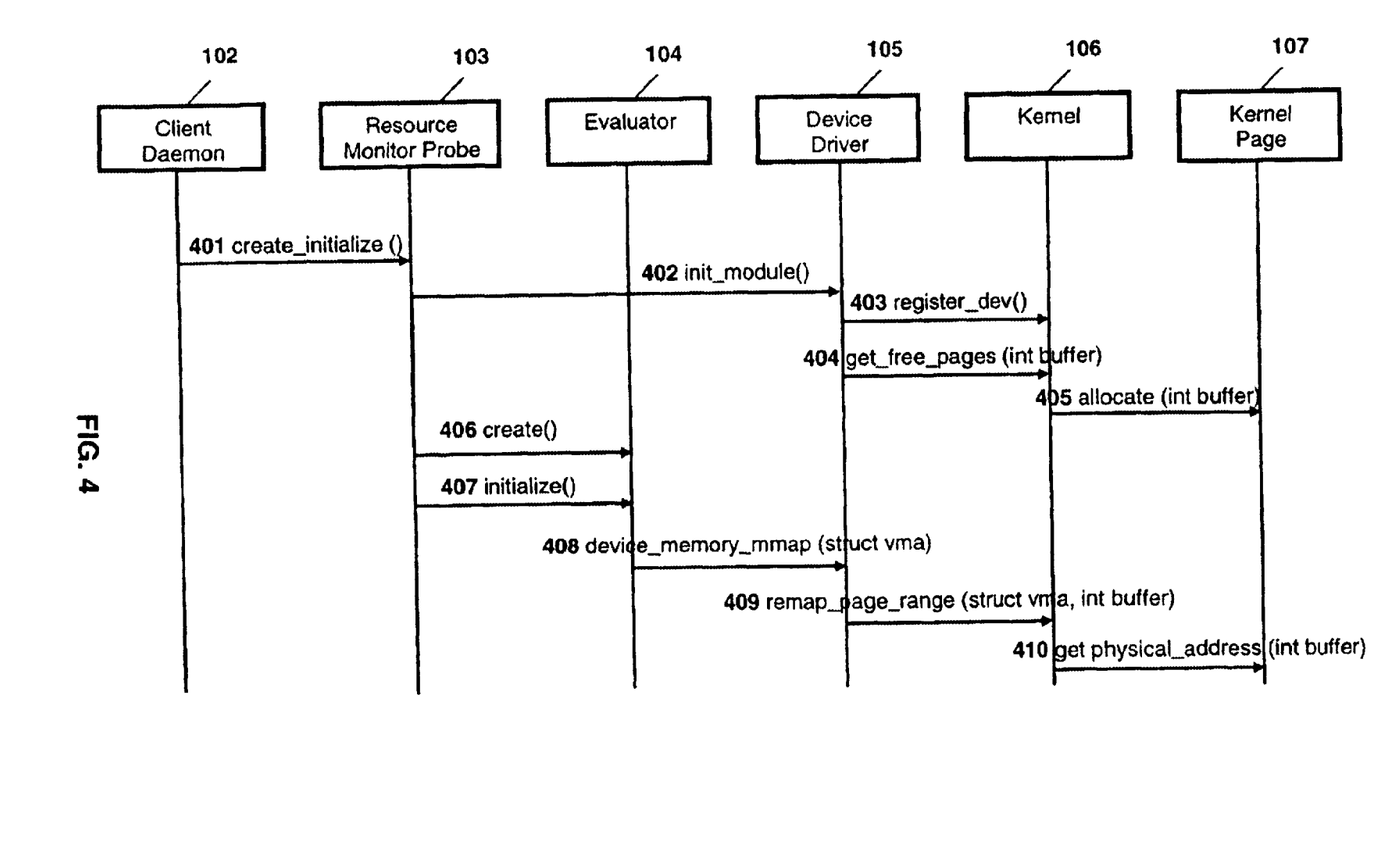
FIG. 4 is a sequence diagram that represents how a resource monitor agent initialization takes place on a client system.

FIG. 4 represents how initialization of a Resource Monitor Probe 103 occurs. When Client Daemon 102 receives a request from Monitoring Server 101 to start a Resource Monitor Probe 103, Client Daemon 102 loads the Resource Monitor Probe 103 into memory. Monitoring Probe 103, in turn, loads and initializes a Device Driver 105. This Device Driver 105 performs the role of an interface between the Kernel 106 of the Operating System and the Resource Monitor Probe 103.

This Device Driver 105 at this stage only allocates a Kernel Page 107 for future use by Task Function 109, as described later. After completing initialization of Device Driver 105, Resource Monitor Probe 103 also initializes an Evaluator object 104. The purpose of this Evaluator object 104 is to run an algorithm to process the matrix data collected by the Task Function 109. The matrix data is written at the Kernel Page 107 over a period of time. To map this Kernel Page 107, Evaluator object 104 calls the memory map exported functions of the Device Driver 105. Device Driver 105 creates a virtual page table under the process virtual memory context of the Resource Monitor Probe 103, and links that virtual memory arena to the Kernel Page 107. The purpose of virtual mapping is to avoid creating duplicate data for the User Space and Kernel Space. Table 2 below describes, in outline, steps of FIG. 4.

TABLE 2

| | |
|---|---|
| Step 401 | Client Daemon 102 creates and initializes Resource Monitor Probe 103. |
| Step 402 | Probe Agent 103 loads and Initializes a Device Driver 105, which act as an interface to the Operating System, and performs low-level functionality. |
| Step 403 | Device Driver 105 registers itself to the Operating System. |
| Step 404 | Device Driver 105 requests a Kernel Page 107 of 4 kilobytes in size. |
| Step 405 | Kernel 106 allocates a Kernel Page 107 from its heap of physical memory and returns the address in a buffer pointer register to Device Driver 105. |
| Step 406 and 407 | Resource Monitor Probe 103 creates and initializes the Evaluator Object 104. |
| Step 408 | Evaluator Object 104 calls the memory map exported function of Device Driver 105. |
| Step 409 | Device Driver 105 creates a virtual page table, for the physical page obtained in step 405, under the context of the Resource Monitor Probe 103. The purpose of virtual mapping is to avoid duplication of data in User Space and Kernel Space. |

EXAMPLE 2

Start of a Probe Process

Figure 5:
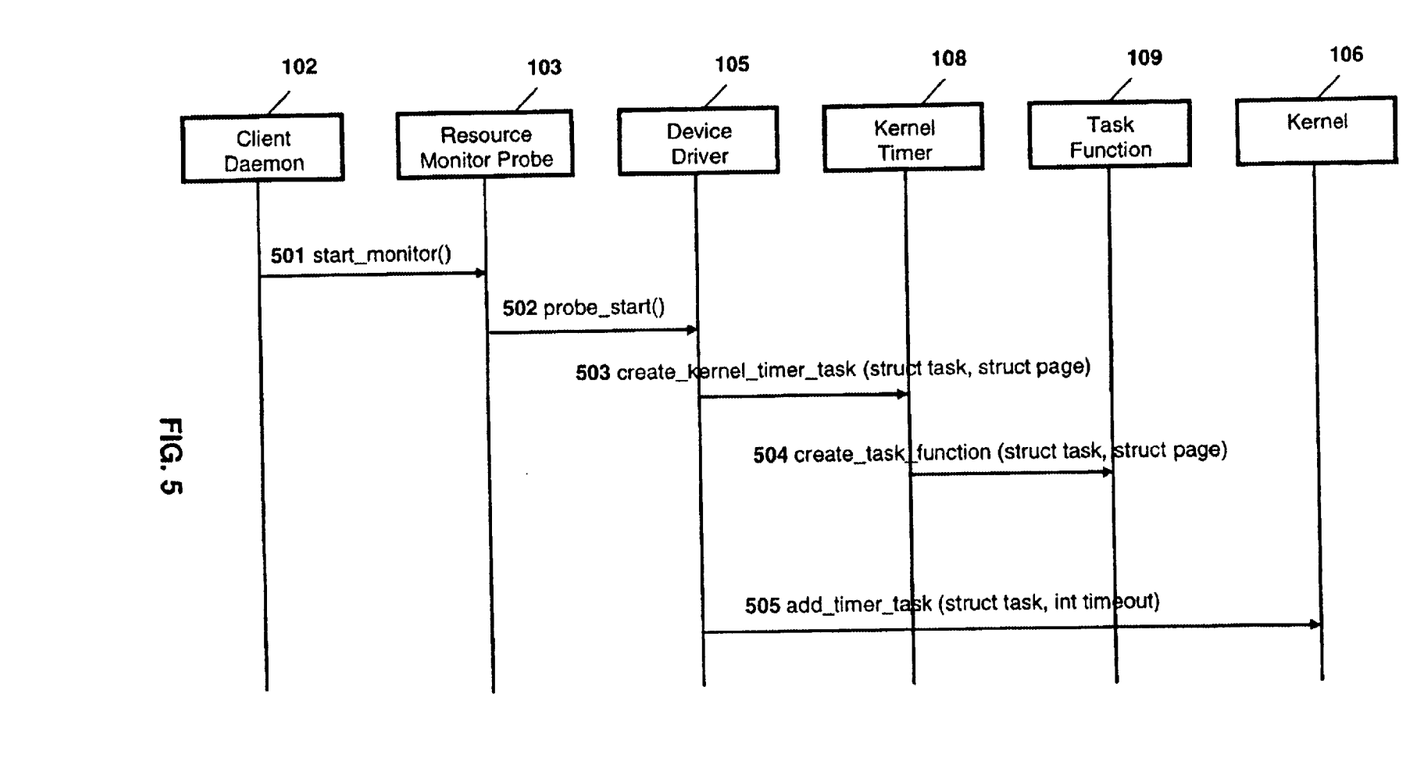
FIG. 5 is a sequence diagram that represents how a resource monitor agent is invoked on a client system.

FIG. 5 represents how the Resource Monitor Probe 103 is invoked on a Client System. When Client Daemon 102 receives a request from Monitoring Server 101 to initiate probing, Client Daemon 102 invokes an appropriate Resource Monitor Probe 103, such as for monitoring process or network activity. Resource Monitor Probe 103 forwards the message to the Device Driver 105 by calling a suitable interface. Device Driver 105 creates a Task Function 109 with a timeout value. Device Driver 105 also registers a function to the Task Function 109. This function is invoked during each timeout, and executes independently of any process context. Device Driver 105 finally registers this timer task, that is, Task Function 109 with the Kernel 106 of the Operating System. Table 3 below describes, in outline, steps of FIG. 6.

TABLE 3

| | |
|---|---|
| Step 501 | Client Daemon 102 receives a request from Monitoring Server 101 to start Resource Monitor Probe 103 loaded on the Client System. |
| Step 502 | The request is forwarded to Device Driver 105. |
| Step 503 | Device Driver 105 creates a Kernel Timer 108, with a timeout value. |
| Step 504 | Register a Task Function 109 to the Kernel Timer 108. This function is invoked in each timeout, and executes independently of any process context. |
| Step 505 | Register a Kernel Timer 108 with the Kernel 106 of the Operating System. |

EXAMPLE 3

Run Monitor

Figure 6:
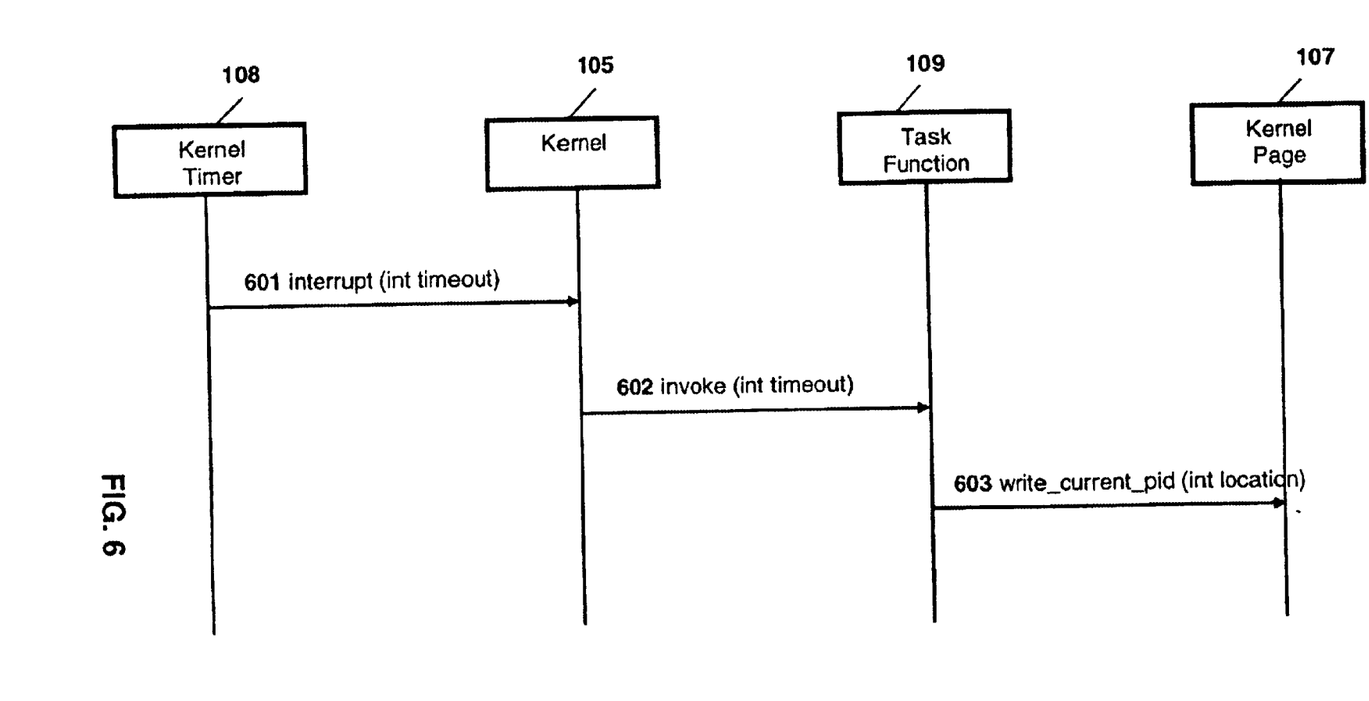
FIG. 6 is a sequence diagram that represents how the kernel probe task routine executes.

FIG. 6 represents how a probe task routine in form of Task Function 109 of a Kernel Timer 108 executes on a Client System. The Kernel 106 of the Operating System receives an interrupt during each timeout. This timeout is specified by the Device Driver 105 during registration of the task. Task Function 109, linked to this task, is invoked. This Task Function 109 is lightweight and only executes a very small section of code to log an observed property of a distributed resource to the Kernel Page 107 in circular fashion. The recursive logging means that when the kernel page is full, it will start overwriting from the top. Table 4 below describes, in outline, steps of FIG. 6.

TABLE 4

| | |
|---|---|
| Step 601 | Kernel 106 of the Operating System receives an interrupt during each timeout from the Kernel Timer 108. This timeout is specified by the Device Driver 105 as a variable item of Task Function 109, during registration of the Task Function 109. |
| Step 602 | Task Function 109 is invoked as specified by Device Driver 105 during registration of the kernel task. |
| Step 603 | This Task Function 109 is "lightweight" and only writes an observed parameter of a resource, to the resident kernel memory in circular fashion, namely the Kernel Page 107. |

EXAMPLE 4

Status of a Distributed Application

Figure 7:
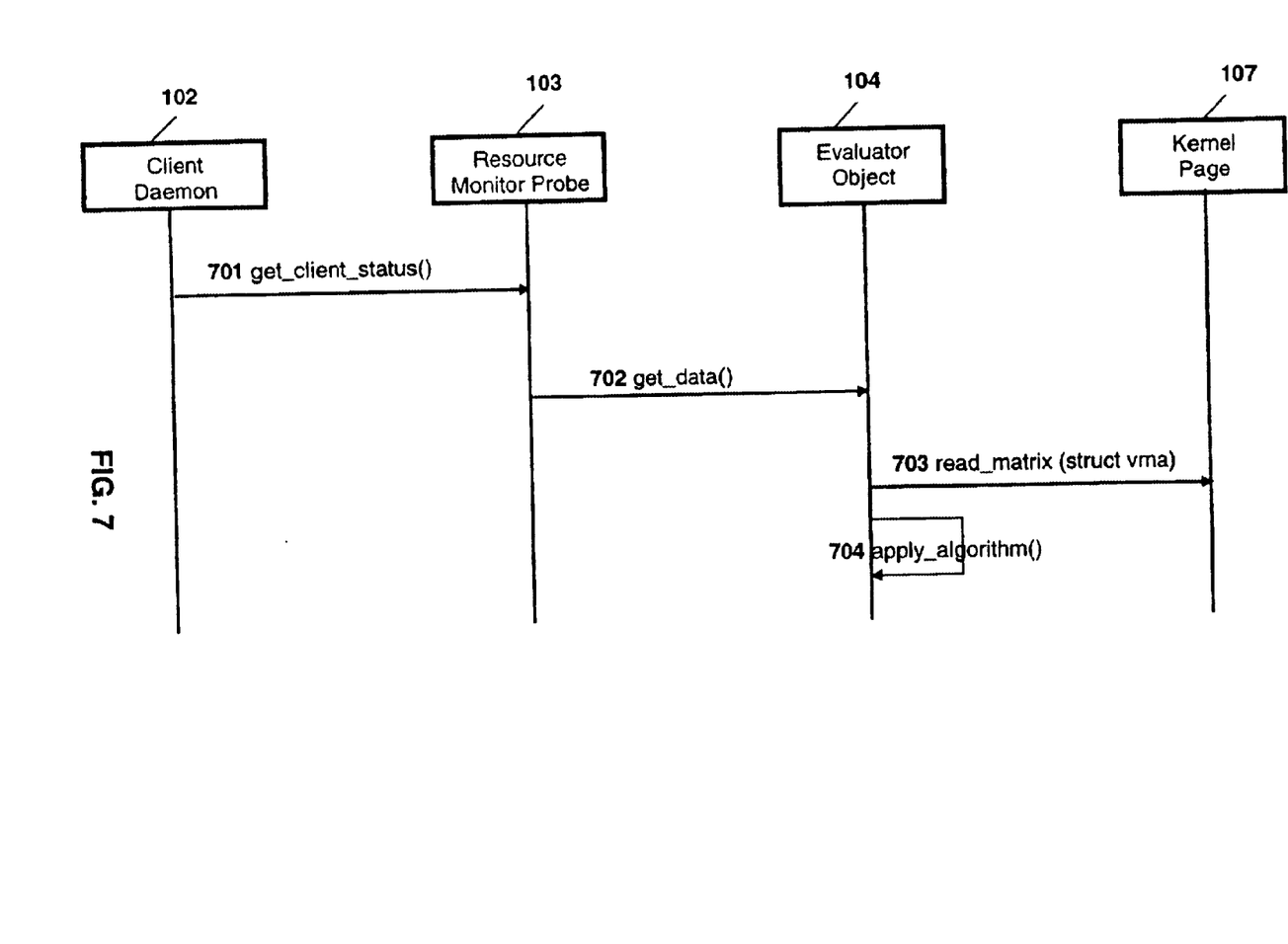
FIG. 7 is a sequence diagram that represents receiving and processing of a request from the server to know the status of a distributed resource.

FIG. 7 represents an example in which Client Daemon 102 receives a request from the Monitoring Server 101 to check the status of a distributed resource. The appropriate Resource Monitor Probe 103 forwards the request to its Evaluator Object 104. Evaluator Object 104 reads the matrix data from Kernel Page 107. This Kernel Page 107 is mapped to the process context of the Probe 103 during initialization. Evaluator Object 104 applies a simple algorithm on the matrix data to calculate the load on the Client System for the particular distributed application requested by the Monitoring Server 101. The processed data is then forwarded to the Monitoring Server 101 using a predefined communications protocol. Table 5 below describes, in outline, steps of FIG. 7.

TABLE 5

| | |
|---|---|
| Step 701 | Client Daemon 102 receives a request for a distributed resource status from the Monitoring Server 101. |
| Step 702 | Resource Monitor Probe 103 forwards the request to its Evaluator Object 104. |
| Step 703 | Evaluator Object 104 directly reads the matrix data from Kernel Page 107. This Kernel Page 107 is written by the Task Function 109 asynchronously, and the same Kernel Page 107 is mapped to the virtual page table of the Resource Monitor Probe 103 during initialization. |
| Step 704 | Evaluator Object 104 applies a simple analysis algorithm on the matrix data to consolidate the data, before sending the resource status, as requested by the Monitoring Server 101. |

EXAMPLE 5

Stop Probe

Figure 8:
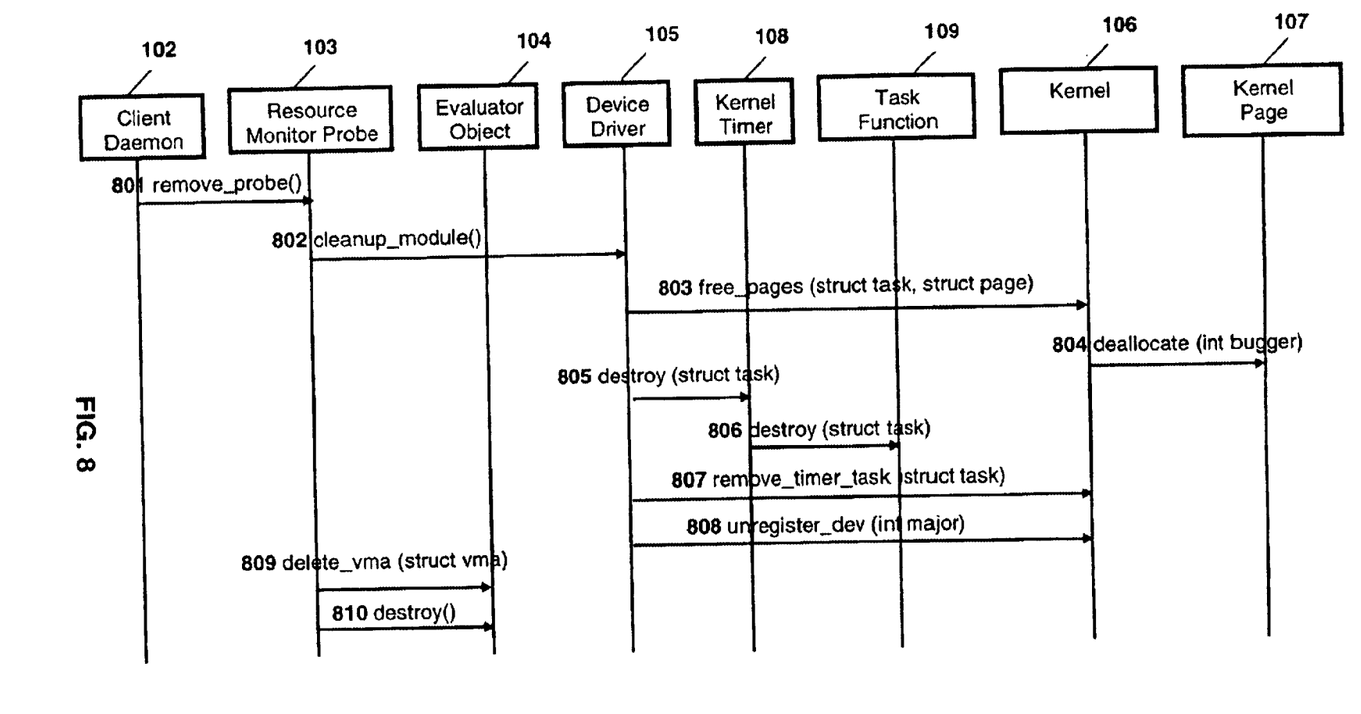
FIG. 8 is a sequence diagram that represents the sequence of events when the Client System receives a request to stop the Resource Monitoring Agent.

FIG. 8 represents an example in which the Client Daemon 102 receives a request to stop a Resource Monitor Probe 103 on a Client System. The Resource Monitor Probe 103 calls an interface of the Device Driver 105 to "clean up" its resources. Device Driver 105 frees the Kernel Page 107. Device Driver 105 then destroys the Task Function 109 and Task Function 109. The reference of the Kernel Timer 108 is removed from the Kernel 106. The resource Probe Agent 103 then deletes the virtual mapping created for Evaluator Object 105. Resource Monitor Probe 103 then removes the Device Driver 105 from memory, and finally destroys the Evaluator Object 104. Table 6 below describes, in outline, steps of FIG. 8.

TABLE 6

| | |
|---|---|
| Step 801 | Client Daemon 102 receives a request to stop the Resource Monitor Probe 103. |
| Step 802 | Resource Monitor Probe 103 then sends a request to Device Driver 105 to "clean up" its resources. |
| Step 803 and 804 | Device Driver 105 frees the Kernel Page 107. |
| Step 805 and 806 | Device Driver 105 then destroys Kernel Timer 108 and Task Function 109. |
| Step 807 | Device Driver 105 then removes the timer task registered to the Kernel 106. |
| Step 808 | Device Driver 105 sends a request to unregister itself from Kernel 106 of the Operating System. |
| Step 809 | Resource Monitor Probe 103 deletes the virtual mapping created for Evaluator Object 104. |
| Step 810 | Resource Monitor Probe 103 finally destroys the Evaluator Object 104. |

Conclusion

The probe agent design described herein deviates from an existing style of application programming in the domain of distributed computing. An interrupt-based programming model is adopted to develop kernel probe task routines for monitoring resources. Responsibility for monitoring these executed task routines is delegated to the kernel of the operating system. The probe design adopts the notion of monitoring resources using mechanisms ordinarily used by the operating system itself to monitor system resources.

The probe agent is transparent to the user, and the client system. Further, the probe agent is also independent of the workload on the client system, and has negligible impact on the applications or resources on the system. The design of resource monitor driver, however, is desirably such that the task function only performs minimum required operations, since this driver automatically executes every 10 ms, as an example, in kernel mode.

In relation to the accuracy of the probe, there is no delay involved in each probing, since task functions are invoked in interrupt mode. Operating system timers are precise up to the level of processor clock frequency.

The described probe agent can be implemented in any distributed computing environment in which two or more computer systems are connected by a network, including environments in which the networked computers are of different types. Various alterations and modifications can be made to the techniques and arrangements described herein, as would be apparent to one skilled in the relevant art.

I claim:

1. A method performed by a computer system for monitoring resources in the computer system, the method comprising the steps of:
   (i) receiving, by a client daemon of the computer system, a request for monitoring a resource of the computer system;
   (ii) creating a monitoring application by the client daemon;
   (iii) initializing, by the monitoring application,
   a device driver for communication with a kernel of an operating system to monitor a resource;
   (iv) executing the kernel task object to collect and store data relating to the monitored resource; and
   (v) processing the stored data by an evaluator object created by the monitoring application.

2. The method as claimed in claim 1, wherein the kernel task object has a predetermined timeout value.

3. The method as claimed in claim 2, further comprising the step of registering the kernel task object with a kernel of the operating system.

4. The method as claimed in claim 1, wherein step (v) includes periodically executing the kernel task object.

5. The method as claimed in claim 1, wherein step a includes receiving the request to monitor the resource from a server able to communicate with the computer system.

6. The method as claimed in claim 1, further comprising the step of transmitting the collected data.

7. Computer software stored in a computer-readable medium and executing under a computer operating system, the computer software comprising:
   (i) a client daemon for receiving a request for monitoring a resource;
   (ii) a monitoring application created by the client daemon;
   (iii) a device driver initialised by the monitoring application for communication with a kernel of an operating system;
   (iv) a kernel task object created by the device driver for collecting and storing data concerning the monitored resource; and
   (v) an evaluator object created by the monitoring application for processing the stored data.

8. A computer system for monitoring resources in the computer system, the computer system comprising:
   client daemon means for receiving a request to monitor a resource of the computer system;
   monitoring application means created by the client daemon means;
   device driver means initialized by the monitoring application means for communicating with a kernel of an operating system;
   kernel task object means created by the device driver means for collecting and storing data relating to the monitored resource; and
   evaluator object means created by the monitoring application means for processing the stored data.

* * * * *

UNITED STATES PATENT AND TRADEMARK OFFICE
CERTIFICATE OF CORRECTION

PATENT NO.     : 6,959,264 B2
DATED          : October 25, 2005
INVENTOR(S)    : Partha Mandal It is certified that error appears in the above-identified patent and that said Letters Patent is hereby corrected as shown below:

Column 10,
Line 3, "wherein step a" should read -- wherein step (i) --.

Signed and Sealed this

Seventeenth Day of January, 2006

JON W. DUDAS
*Director of the United States Patent and Trademark Office*